Feb. 24, 1925.

G. C. DEBAY 1,527,633

PROPORTIONAL MIXING APPARATUS

Filed April 15, 1921

INVENTOR
George C. Debay
By Kay, Totten & Brown
Attorneys

Patented Feb. 24, 1925.

1,527,633

UNITED STATES PATENT OFFICE.

GEORGE C. DEBAY, OF SPRINGDALE, PENNSYLVANIA.

PROPORTIONAL MIXING APPARATUS.

Application filed April 15, 1921. Serial No. 461,730.

*To all whom it may concern:*

Be it known that I, GEORGE C. DEBAY, a citizen of the United States, and resident of Springdale, in the county of Allegheny and State of Pennsylvania, have invented a new and useful Improvement in Proportional Mixing Apparatus; and I do hereby declare the following to be a full, clear, and exact description thereof.

My invention relates to apparatus for mixing granular or powdered materials and it has special relation to apparatus for mixing the ingredients of concrete.

The object of my invention is to provide a mixing apparatus of the character indicated in which the several ingredients to be mixed are automatically delivered in the proper proportions to the mixer and in which the relative proportions of the ingredients so delivered may be readily changed.

Figure 1:
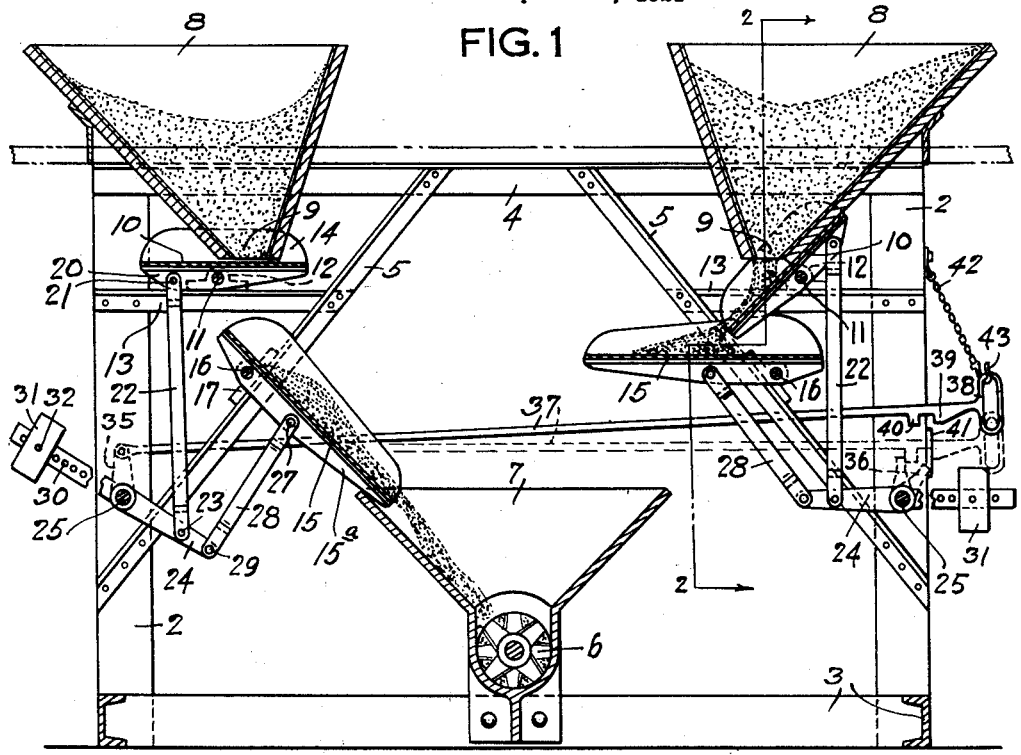
Figure 2:
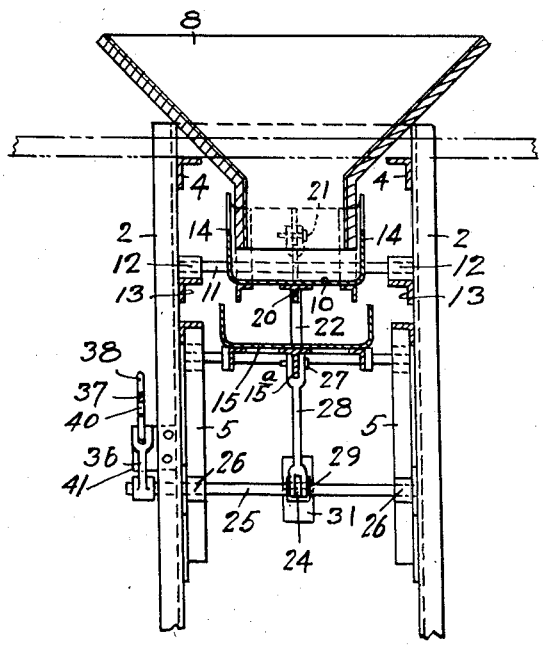

In the accompanying drawing, Fig. 1 is a side view, partly in elevation and partly in section, showing a simple form of proportional mixing apparatus constructed in accordance with my invention, and Fig. 2 is a transverse vertical section taken substantially along the line 2—2, Fig. 1.

The apparatus shown in the drawing comprises a frame having uprights 2, bottom sills 3, top beams 4, and diagonal braces 5. A rotary mixer 6 is mounted on the bottom sills 3, this mixer being of any well known or desired type and being provided with a receiving hopper 7 into which the several ingredients to be mixed are fed from two or more feed hoppers 8 mounted in the upper part of the frame.

My present invention is particularly concerned with the means for transferring the several ingredients in proper amounts from the feed hoppers 8 to the receiving hopper 7.

Each of the feed hoppers 8 has a relatively restricted bottom opening 9 which is closed and opened by means of a combined closure plate and chute 10 that is pivotally mounted on a bar 11 journaled in bearings 12 carried by brackets 13 which extend between the uprights 2 and the diagonal braces 5. The chute 10 has upturned sides 14 and serves the double purpose of closing the opening 9 when in the horizontal position shown at the left of Fig. 1 and, when in the inclined position, as shown at the right of Fig. 1, of transferring the material from the feed hopper to a second chute 15 which is pivotally mounted on a rod 16 journaled in bearings 17 carried by the diagonal braces 5.

The chute 10 has a central rib 20 to which is attached, by means of a pin 21, the forked upper end of a link 22, the lower end of which is similarly forked and is attached by means of a pin 23 to an operating lever 24 that is carried by a rock shaft 25 which extends between the uprights 2 and is mounted in suitable bearings 26. The chute 15 is also provided with a central rib 15ª to which is connected, by means of a pin 27, the forked upper end of a link 28, the lower end of which is likewise forked and is attached by means of a pin 29 to the end of the operating lever 24. The portion of the operating lever 24 which extends beyond the frame is provided with perforations 30 for adjustably positioning a weight 31 which is provided with a pin 32 adapted to enter any one of the perforations 30.

In the operation of the apparatus as thus far described, the several materials to be mixed are placed in the feed hoppers 8 either manually or by means of mechanical loaders. These ingredients may, for example, be cement and sand or gravel to be mixed into concrete. The proportions of the parts are such that the chutes 10 and 15 are normally held in the positions shown at the right of Fig. 1 by the weight 31, at which time the material in the hopper 8 is free to slide in a thin stream down the hopper 10 and upon the hopper 15 which, at this time, is in its horizontal position. When a sufficient quantity of material accumulates upon the chute 15 to overbalance the weight 31, the hopper 15 tilts into the inclined position shown at the left of Fig. 1 and discharges its load into the mixing hopper 7. This movement of the chute 15 acts through the link 28, the lever 24, and the link 22 to raise the chute 10 to its horizontal position, thus cutting off the flow of material from the hopper. As soon as the load is discharged from the chute 15 the weight 31 descends and causes the chutes 10 and 15 to again move from their positions shown at the left of Fig. 1 to the positions shown at the right of Fig. 1, whereupon the cycle of operations again begins.

It will be evident that the amount of material necessary to overbalance each of the chutes 15 depends upon the position of the weight 31 on the operating lever 24 and, since this position can readily be changed, the hoppers can be adjusted to deliver any desired proportions of material within considerable limits.

In order to stop the apparatus whenever desired, I provide the rock shafts 25 with the upstanding arms 35 and 36, respectively. The upper end of the arm 35 is pivotally connected to one end of a rod 37, the opposite end of which is provided with a handle 38 and with two abutments 39 and 40. A plate 41 is secured to one of the uprights 2 and is provided with a vertical slot adapted to receive the rod 37. In the normal operation of the material the rod 37 is held in its raised position, shown in full lines in Fig. 1, by means of a chain 42 and a hook 43, and the rod 37 is thus free to swing lengthwise as the arm 35 oscillates with its rock shaft 25. When it is desired to stop the machine, the handle 38 is released from the hook and the rod 37 is moved down into the slot in the plate 41, the abutment 39 engaging the plate 41 and the abutment 40 engaging the arm 36. Both of the rock shafts 25 are thus held against rotation, with the chutes 10 in their horizontal or closing position. By again raising the rod 37 by means of the handle 38 both of the feeding devices are placed in operation by their weights 31.

It is to be understood that various changes in the form and arrangement of parts may be made without departing from my invention or sacrificing its advantages and I therefore desire that no limitations be imposed on my invention except such as are indicated in the appended claims.

I claim as my invention:

1. Proportional feeding apparatus comprising a plurality of feed hoppers each provided with two pivotally movable chutes, one of said chutes being adapted to close said hopper and being adapted when tilted to direct material from said hopper to the second chute, an operating lever, links for connecting both the said chutes to said operating lever, a weight adjustably mounted on said operating lever, and means for locking all of said chutes against tilting.

2. Proportional feeding apparatus comprising a plurality of feed hoppers each provided with a pivotally movable gate and a pivotally movable chute, the gate being adapted when open to cause a flow of material to the chute, an operating lever for each gate and its associated chute, a link for connecting each lever to its gate and chute, means for yieldingly holding said lever in position to maintain the gate open and the chute in receiving position, and means for locking said levers in position opposite to said yieldingly held position.

In testimony whereof, I, the said GEORGE C. DEBAY, have hereunto set my hand.

GEORGE C. DEBAY.

Witnesses:
ROBT. D. TOTTEN,
JOHN F. WILL.